US012806943B2

(12) United States Patent
Bowe

(10) Patent No.: US 12,806,943 B2
(45) Date of Patent: Nov. 24, 2026

(54) OFFSET GOOSENECK BALL HITCH

(71) Applicant: Curt Manufacturing, LLC, Eau Claire, WI (US)

(72) Inventor: Curtis M. Bowe, Chippewa Falls, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 429 days.

(21) Appl. No.: 18/509,152

(22) Filed: Nov. 14, 2023

(65) Prior Publication Data

US 2024/0157739 A1 May 16, 2024

Related U.S. Application Data

(60) Provisional application No. 63/425,452, filed on Nov. 15, 2022.

(51) Int. Cl.
*B60D 1/06* (2006.01)
*B60D 1/48* (2006.01)
*B60D 1/52* (2006.01)

(52) U.S. Cl.
CPC ............... *B60D 1/06* (2013.01); *B60D 1/065* (2013.01); *B60D 1/485* (2013.01); *B60D 1/52* (2013.01)

(58) Field of Classification Search
CPC ........... B60D 1/065; B60D 1/485; B60D 1/52
USPC ........................................................ 280/511
See application file for complete search history.

(56) References Cited

U.S. PATENT DOCUMENTS 5,016,898 A 5/1991 Works
6,065,766 A 5/2000 Pulliam
6,158,761 A * 12/2000 King ..................... B60D 1/488 280/495
6,695,338 B1 * 2/2004 Roberts .................... B60D 1/06 280/514
6,969,090 B1 11/2005 Works
7,988,176 B2 8/2011 Colibert et al.
7,988,177 B2 8/2011 Colibert et al.
8,215,658 B2 7/2012 Stanifer et al.
8,360,458 B2 1/2013 Stanifer et al.
8,414,009 B2 4/2013 Stanifer et al.
8,955,866 B2 2/2015 Bowe
11,192,408 B2 12/2021 Fisher et al.
2012/0031940 A1 2/2012 Leech et al.
2013/0113181 A1 5/2013 Stanifer et al.
(Continued)

*Primary Examiner* — Jacob D Knutson
(74) *Attorney, Agent, or Firm* — Shewchuk IP Services, LLC; Jeffrey D. Shewchuk

(57) ABSTRACT

An offset gooseneck ball hitch has a shank received in a vertical OEM gooseneck socket and an offset hitch ball provided on an offset body. A frame connection structure allows the offset gooseneck ball hitch to mate into at least two different OEM puck spacings relative to the vertical OEM gooseneck socket. The frame connection structure preferably includes a driver side transverse anchor assembly having a driver side anchor, a passenger side transverse anchor assembly having a passenger side anchor, and a longitudinal connection weldment securable to the driver side transverse anchor assembly, to the passenger side transverse anchor assembly, and to the offset body. The offset body preferably includes a pivot handle for securing the shank in the vertical OEM gooseneck socket, and the anchors preferably each include a T-bolt with a handle for pivoting the T-bolt within the OEM puck socket.

19 Claims, 16 Drawing Sheets

OE Bed Layouts

(56) References Cited

U.S. PATENT DOCUMENTS

| | | | | |
|---|---|---|---|---|
| 2022/0072919 | A1* | 3/2022 | Garner .................. | B60D 1/485 |
| 2023/0061552 | A1* | 3/2023 | Borkholder ........... | B60D 1/488 |

* cited by examiner

OE Bed Layouts

OFFSET GOOSENECK BALL HITCH

CROSS-REFERENCE TO RELATED APPLICATION(S)

The present application claims priority from U.S. Provisional Application No. 63/425,452 entitled OFFSET GOOSENECK BALL HITCH filed Nov. 15, 2022, incorporated herein by reference.

BACKGROUND

The present invention relates to gooseneck ball hitches. Removable gooseneck hitch balls are known, such as disclosed in U.S. Pat. Nos. 5,016,898 and 6,969,090, both incorporated by reference. In general, the gooseneck hitch ball is purchased with a base or shank which matches and mates with the specific shape of the socket of the hitch: CURT Manufacturing of Eau Claire, Wisconsin has for several years sold a line of removable gooseneck hitches with a socket and base/shank which are circular in horizontal cross-section, secured with two pins through the base/shank, whereas B&W Trailer Hitches of Humboldt, Kansas has for several years sold a line of removable gooseneck hitches with a socket and base/shank which is square in horizontal cross-section, secured with a single pin through the base/shank.

More recently, improvements have been devised which allow relative movement between a hitch ball and its base/shank, as disclosed in U.S. Pat. No. 11,192,408, incorporated by reference. The hitches of U.S. Pat. No. 11,192,408 include a compressible insert placed within the structure to compressibly resist the relative movement.

Separately, various pickup truck manufacturers (referred to as "original equipment manufacturers" or OEMs) have begun incorporating "puck" type socket receiver openings exposed in spaced locations in their pick-up truck bed. These include GM, FORD, RAM (FCA) and NISSAN. Examples of existing "puck" type sockets include those disclosed in U.S. Pat. Pub. Nos. 2012/0031940 and 2013/0113181 and U.S. Pat. Nos. 6,065,766, 7,988,176, 7,988,177, 8,215,658, 8,360,458, 8,414,009, each incorporated by reference. The most common puck socket design involves a generally rectangular or oblong slot which can receive the head of a T-bolt. The sockets are located in the pickup truck bed, generally flush with the face of the truck bed. The sockets are used when the hitch or other device is installed, but the truck bed with its sockets is generally flat so as to be used without interference when the hitch or other device is absent. To use the socket, the T-bolt is inserted vertically (head down) into the socket and then rotated 90° so the long part of the T-bolt head is under the narrower flats of the socket. In one existing socket design, the slot is about one inch wide and about 1.63 inches long, with curved ends so the entire slot fits within a 1.63 inch diameter circle.

In general, the OEMs have made no attempt (or, if any attempt has been made, it has be unsuccessful) to standardize their puck-type receiver openings. When OEMs provide a socket for receiving a removable gooseneck hitch ball, the socket is generally positioned over the rear axle centered in the pickup truck bed. FIG. 1 shows placement locations of the puck-type receiver openings used by OEMs relative to their gooseneck hitch ball socket. As shown in FIG. 1, RAM provides four puck-type receiver openings that are more widely spaced than the other OEMs, while GM (both model years 2000+ and more so 2016-2019) located their four puck-type receiver openings shifted rearwardly relative to the gooseneck hitch ball socket, whereas NISSAN only provides two puck-type receiver openings.

Mounting systems which work for one OEM's truck beds may not work for another OEM's truck beds. Aftermarket mounting system suppliers must keep separate inventories for each manufacturer. Ordering of aftermarket mounting systems is more complicated and confusing for customers than it needs to be. If the user switches makes of pick up trucks, their previously purchased aftermarket mounting system will often not work with their new pick up truck.

Further, OEM puck systems may place the central socket too far forward in the truck bed for some trailers, particularly for short-bed trucks. This offset problem is shown relative to FIGS. 2 and 3. The OEM positions the gooseneck hitch ball socket a distance A behind the cab of the truck. When towing a trailer having a trailer halfwidth of D during a tight turn, in certain gooseneck towing applications depending upon the relationship between the distance A and the trailer halfwidth D, the trailer might make damaging contact with the cab as shown in FIG. 2. In such situations, placing the rotational axis of the gooseneck ball further rearward in the bed is needed for additional clearance to prevent cab damage during tight turning. To rectify the offset problem, aftermarket hitch manufacturers have previously marketed offset goose balls which allow the gooseneck ball axis to be located a distance B behind the socket axis. As shown in FIG. 3, the offset goose ball allows the trailer to make a tight turn without damaging contact between the trailer and the cab.

While aftermarket hitch manufacturers have previously marketed offset goose balls which allow the gooseneck ball axis to be located behind the socket axis, the OEM puck systems may not facilitate securing a gooseneck hitch ball against rotational motion in the same way as aftermarket gooseneck hitch balls, preventing the use of a "traditional" aftermarket offset goose ball in an OEM gooseball socket. Aftermarket offset gooseballs typically prevent rotation either via pins that extend through the offset gooseball shank or via shank geometry. On the other hand, OEM goose balls may use ball bearings as extension structures to retain the goose ball in the gooseball receiver socket, wherein the gooseball sits on top of a cylinder and the ball bearings are received in a half round circumferential groove down in the cylinder. The ball bearings allow free ball rotation in the cylinder, and OEM goose balls currently have no way of stopping ball rotation. Better offset gooseneck hitch solutions are needed.

BRIEF SUMMARY OF THE INVENTION

The present invention is an offset gooseneck ball hitch for use with OEM gooseneck sockets and OEM puck systems. The offset gooseneck ball hitch has a shank which mates into the OEM socket. A frame connection structure is used, connected into at least one and more preferably two anchor points of the OEM puck system, which anchors the offset gooseneck ball hitch against rotation about the gooseball socket axis. Preferred embodiments of the present invention use two transversely spaced puck anchor locations to secure the frame connection structure, with a longitudinally-running center support of the frame connection structure connected to an offset body for the gooseneck ball, with the offset body having a shank secured into the central gooseball socket of the OEM system.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 4:
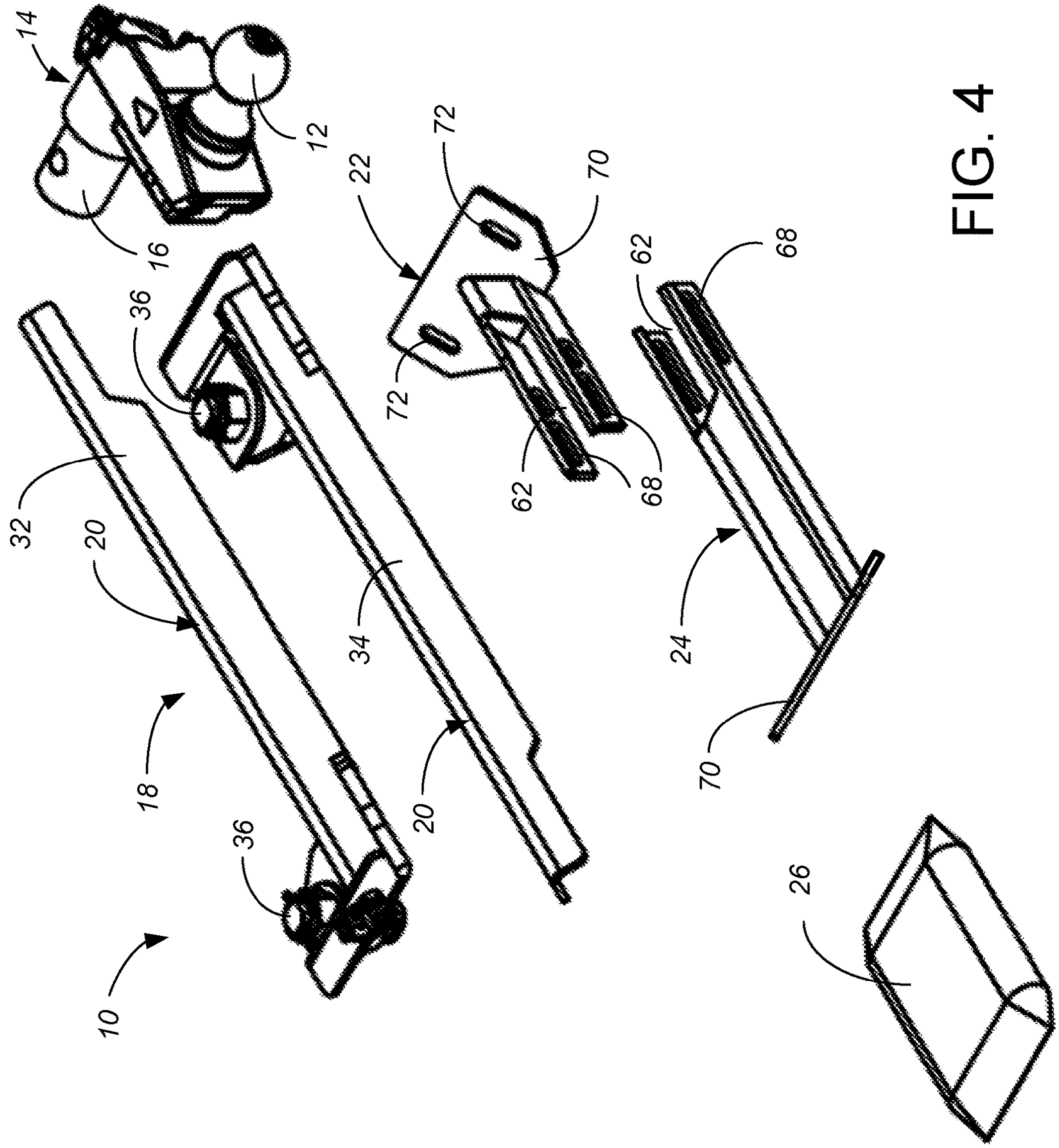
FIG. 4 is a perspective view, showing the contents of a preferred offset gooseneck ball hitch kit in accordance with the present invention.
Figure 5:
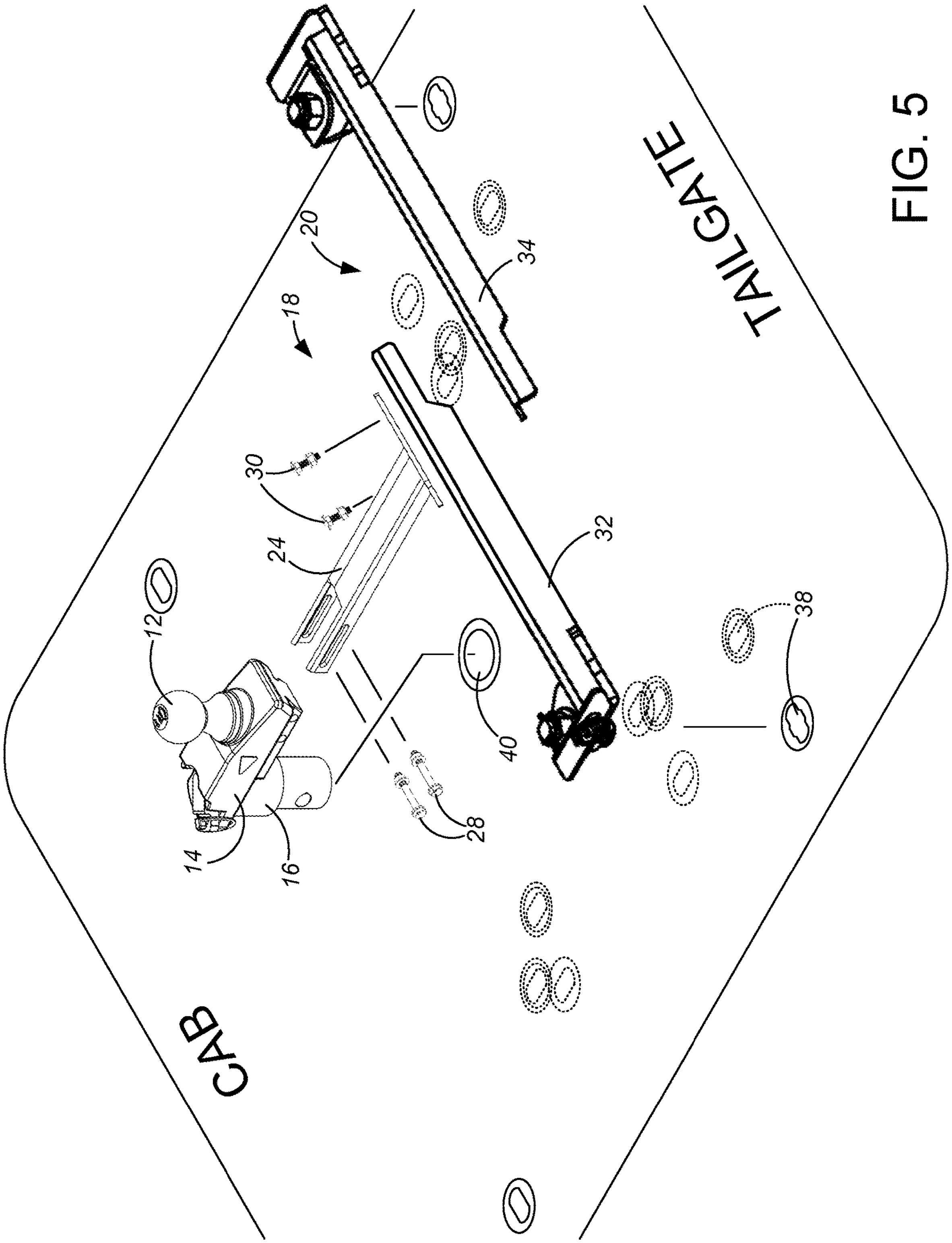
FIG. 5 is a rear perspective exploded view, showing assembly of the preferred offset gooseneck ball hitch into a gooseneck hitch ball socket of a schematically shown RAM (FCA) pickup truck bed, and showing some of the puck socket positions of other OEMs in dotted lines.
Figure 6:
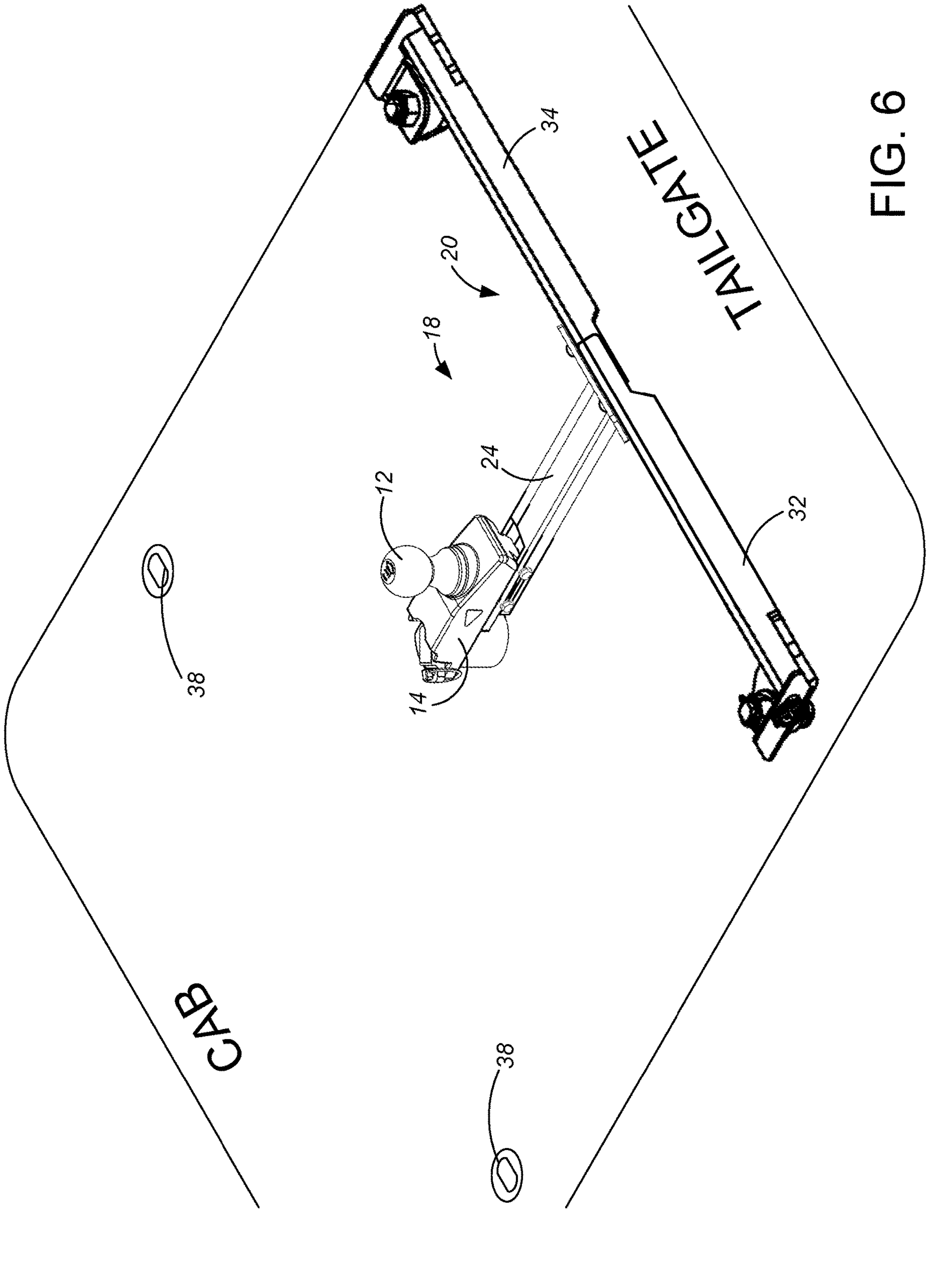
FIG. 6 is a rear perspective view, showing the preferred offset gooseneck ball hitch installed into the schematically shown RAM (FCA) pickup truck bed.
Figure 7:
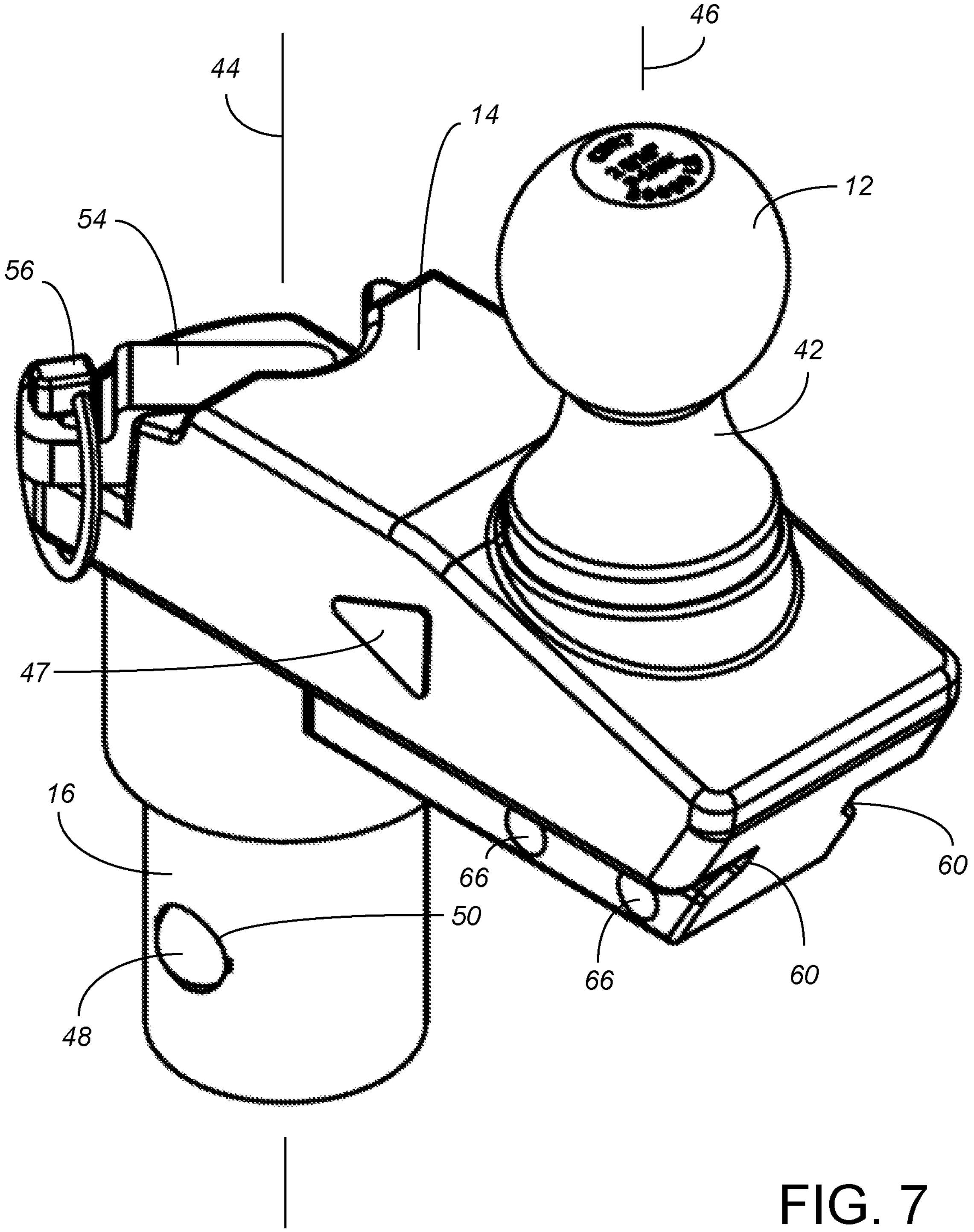
FIG. 7 is a rear perspective view of the offset gooseball assembly of the preferred offset gooseneck ball hitch kit of FIGS. 4-6.
Figure 9:
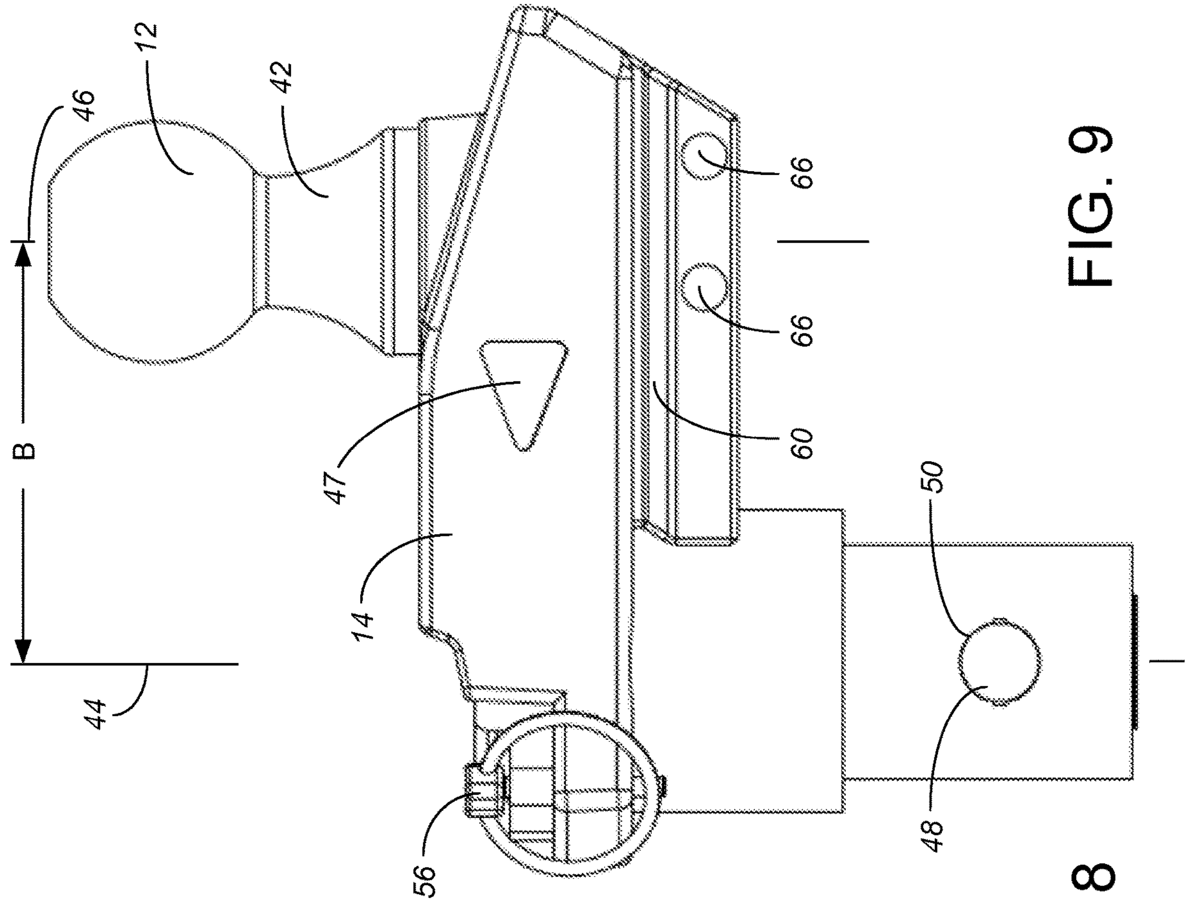
FIG. 9 is a driver side view of the offset gooseball assembly of FIGS. 7 and 8.
Figure 8:
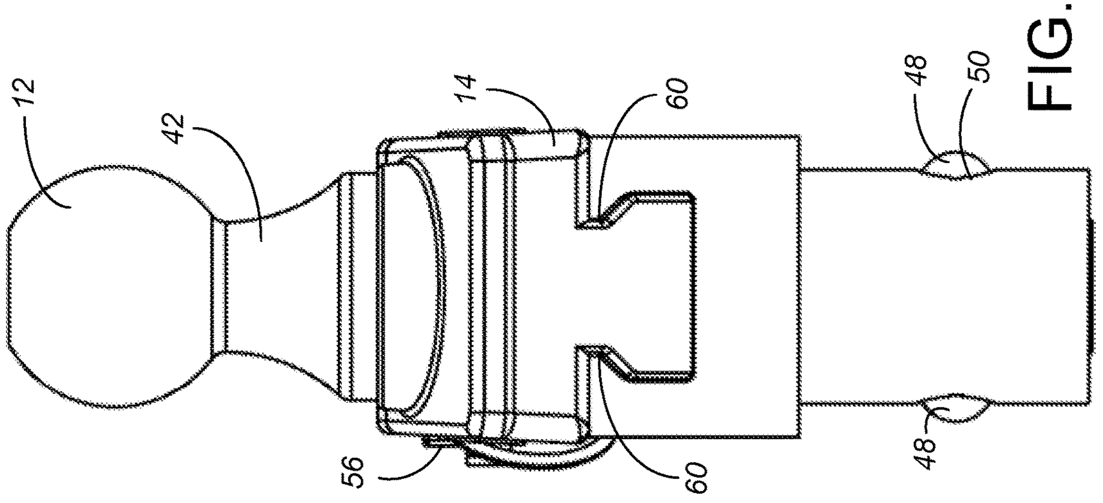
FIG. 8 is a rear elevation view of the offset gooseball assembly of FIG. 7.
Figure 10:
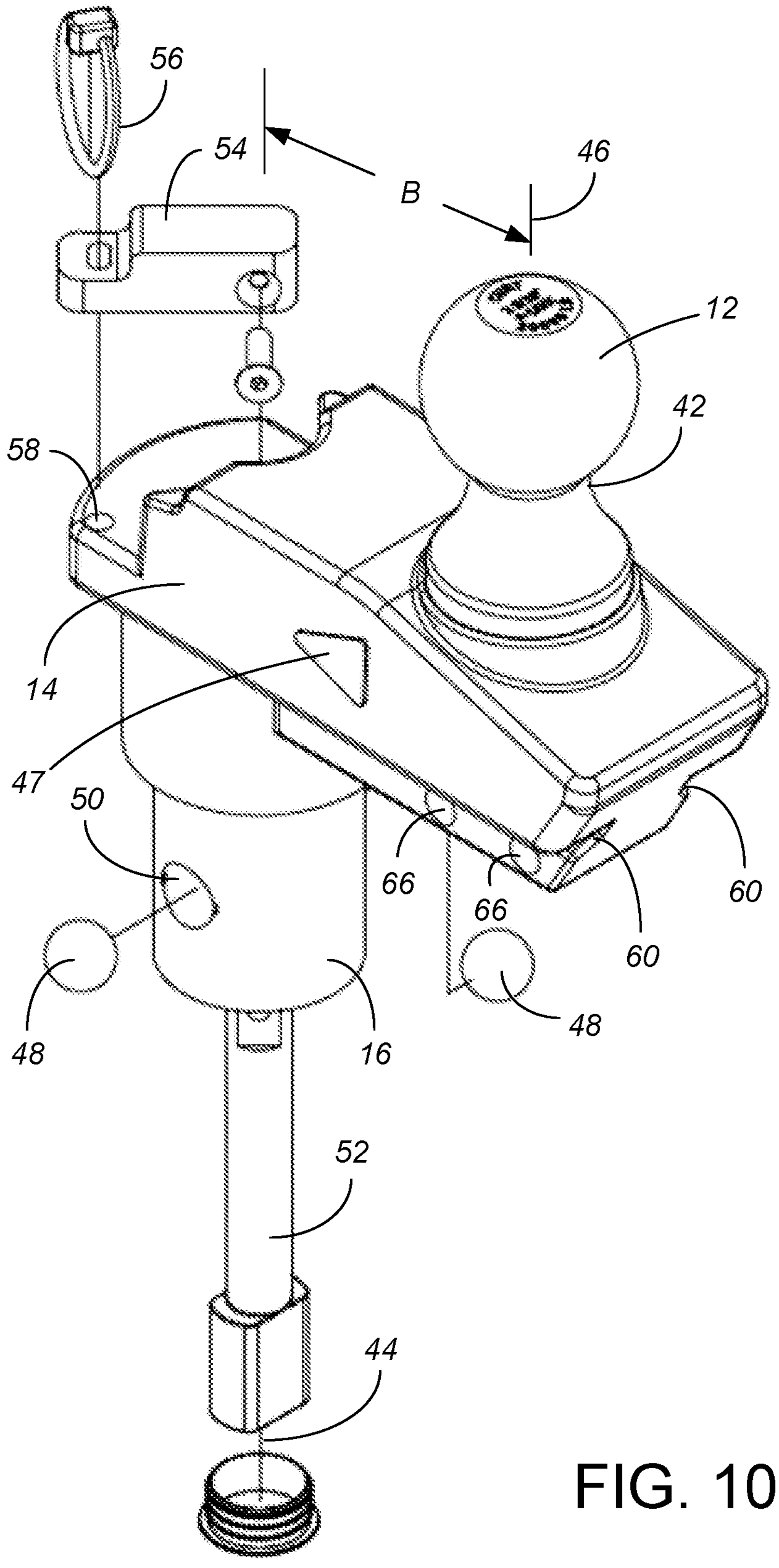
FIG. 10 is an exploded rear perspective view of the offset gooseball assembly of FIGS. 7-9.
Figure 11:
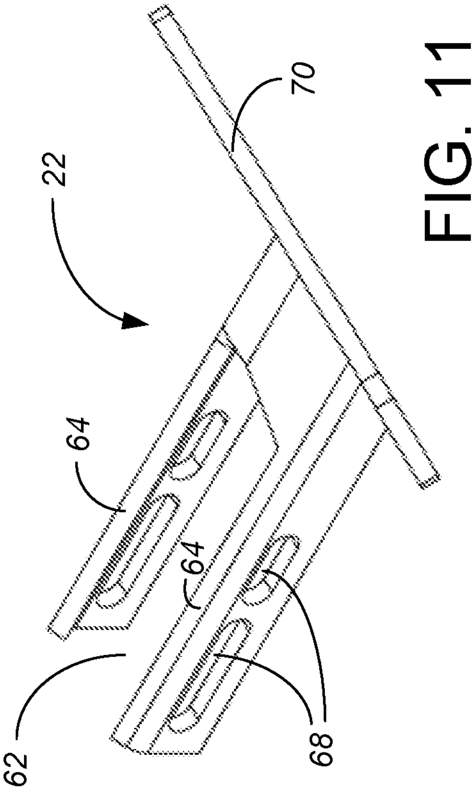
FIG. 11 is a rear perspective view of the short longitudinal connection weldment from the the preferred offset gooseneck ball hitch kit of FIG. 4.
Figure 12:
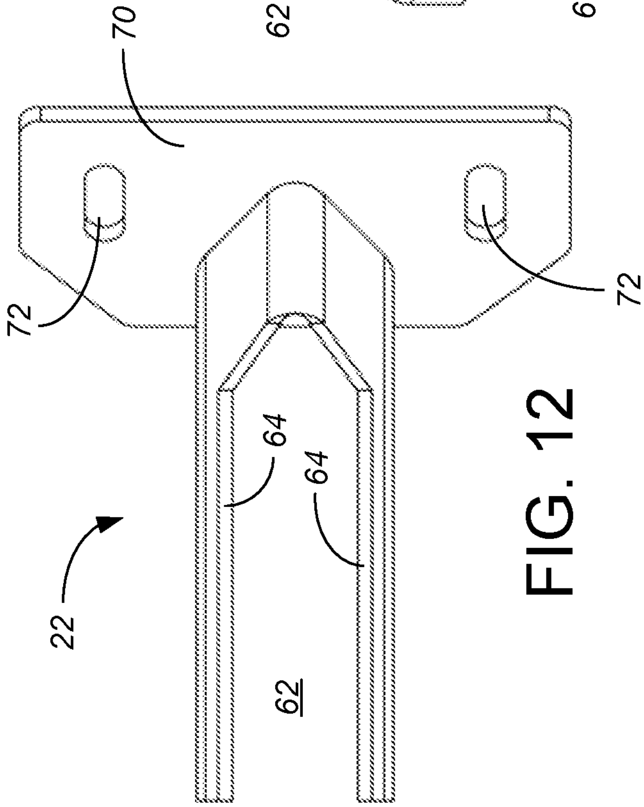
FIG. 12 is a top plan view of the short longitudinal connection weldment of FIG. 11.
Figure 13:
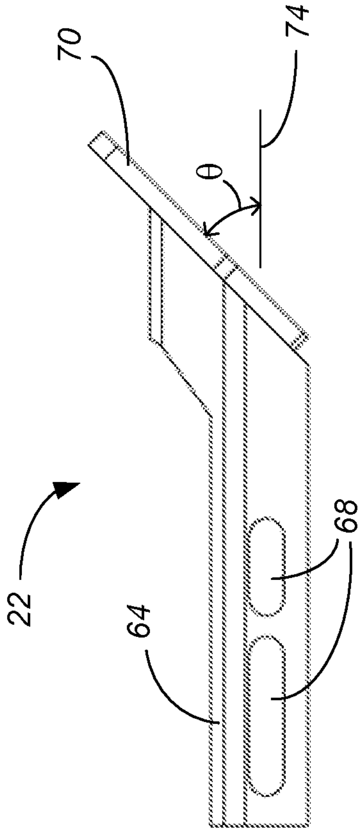
FIG. 13 is a driver side view of the short longitudinal connection weldment of FIGS. 11 and 12.
Figure 14:
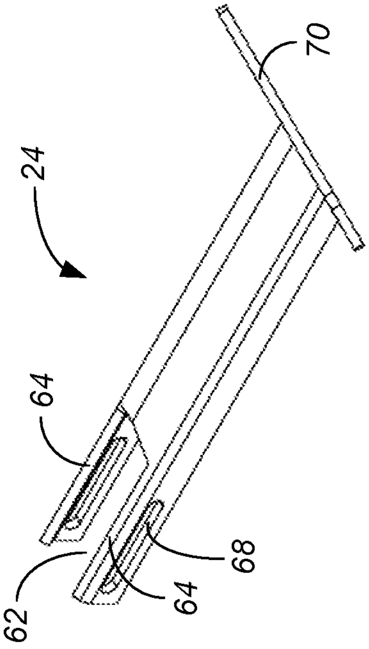
FIG. 14 is a rear perspective view of the long longitudinal connection weldment from the the preferred offset gooseneck ball hitch kit of FIGS. 4-6.
Figure 15:
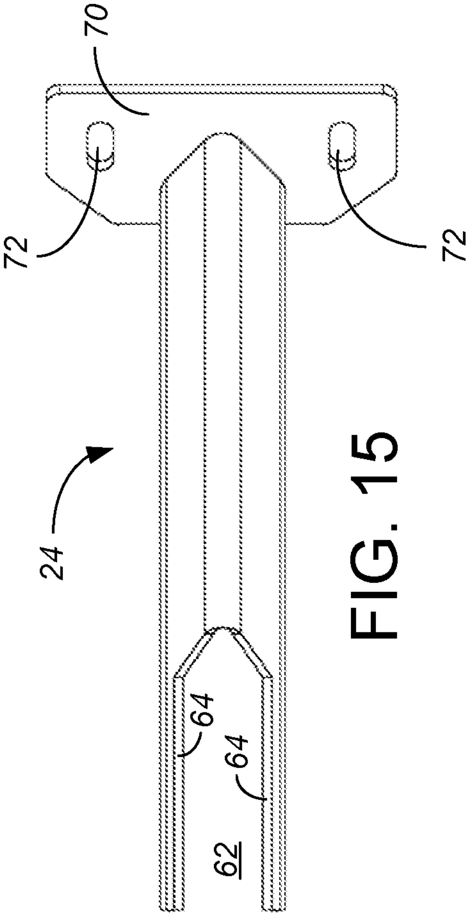
FIG. 15 is a top plan view of the long longitudinal connection weldment of FIG. 14.
Figure 16:
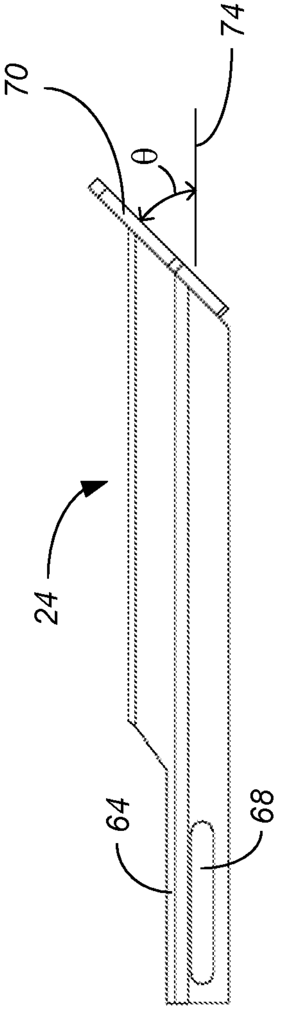
FIG. 16 is a driver side view of the long longitudinal connection weldment of FIGS. 14 and 15.

The components of a first preferred embodiment kit 10 are shown in FIG. 4, with an example application shown in FIGS. 5 and 6. The kit 10 includes a gooseball 12 on an offset body 14 and shank 16. A frame connection structure 18 is provided by two transverse arm assemblies 20 as well as either of a short center extension weldment 22 (used with FORD, NISSAN and some GM puck locations) or a long center extension weldment 24 (used with RAM and some GM puck locations). By providing two different extension weldments 22, 24, the single offset gooseneck ball kit 10 can be sold to any user, regardless of OEM pickup truck owned by that user. The kit 10 also preferably includes a hardware pack 26, such as containing four bolts 28, 30 with nuts. In FIGS. 5 and 6, the application is for a RAM pickup truck, so only the long center extension weldment 24 is used.

Each of the arm assemblies 20 includes an L-bracket arm 32, 34 (also referred to as angle bars) with a T-bolt foot anchor 36 on its outer end. The T-bolt foot anchor 36 can mate into one of the OEM puck sockets 38. In use, the two L-bracket arms 32, 34 overlap one another. The overlapping arrangement alleviates some binding possibility or adjustment difficulty of the width between the two T-bolt feet 36, as well as reduces cost. To facilitate overlapping, the L-shape of one of the L-bracket arms (in the preferred embodiment, the driver side L-bracket arm 32) is wider than the other, so it will sit on top of the other L-bracket arm 34 with both L-bracket arms 32, 34 sitting on the truck bed.

FIGS. 7-10 better show the gooseball 12 and offset body 14. In this embodiment, the gooseneck ball 12 is in a fixed position extending upwardly relative to the offset body 14, while the cylindrical shank 16 extends downwardly from the offset body 14. The preferred cylindrical shank 16 is about 2.2 inches in diameter to mate into existing OEM gooseball sockets 40. The preferred ball 12 is about 2.3 inches in spherical diameter above a 1¼ inch diameter neck 42. The shank axis 44 is offset from the gooseball axis 46 by an offset distance B, which in the preferred embodiment is about 4 inches. The offset body 14 may include an embossed arrow 47 or similar marking(s) to indicate which direction is forward when the offset body 14 is in the gooseball socket 40. The preferred offset body 14 is formed from 5140 heat treated steel, integrally cast with the shank 16. Alternative embodiments weld the ball 12 to the offset body 14 or attach the ball to the offset body 14 using a nut (not shown). The shank 16 includes two retention balls 48 positioned in a through hole 50 of the shank 16 at an elevation which matches the elevation of the circumferential groove (not shown) provided in common OEM gooseball sockets 40. The two retention balls 48 are staked in on both sides of the through hole 50 in the shank 16 so that balls 48 cannot come fully loose from the offset body 14. A retention paddle 52 with a paddle pivot handle 54 pivots within the cylindrical shank 16 and is used to push the retention balls 48 outward into the circumferential groove once the shank 16 is dropped into the OEM gooseball socket 40. The retention paddle concept is similar to that disclosed in U.S. Pat. No. 8,955,866, incorporated by reference. In one rotational position of the retention paddle 52 relative to the cylindrical shank 16, the large dimension of the retention paddle 52 is between the retention balls 48, holding the retention balls 48 so they project outwardly beyond the cylindrical profile of the shank 16. If the retention paddle 52 is pivoted 90°, the thin dimension of the retention paddle 52 is between the retention balls 48, allowing the retention balls 48 to retract into the cylindrical shank 16. A lynch pin 56 can be used, placed in a recess 58 of the offset body 14, to secure the pivot handle 54 of the retention paddle 52 in the locked position with the large dimension of the retention paddle 52 running between the retention balls 48.

The offset body 14 mates with the frame connection structure 18 so as to allow the distance and/or orientation of the shank 16 relative to the anchors 36 to be adjusted, thereby allowing the offset gooseneck ball 12 to be secured into at least two different puck spacings relative to the vertical gooseneck socket 40. In this embodiment, the mating arrangement includes two linear grooves 60 on the rearward end of the offset body 14. The two linear grooves 60 preferably terminate without extending across the shank 16, thereby preserving strength in the shank 16 against bendage or breaking.

As better shown in FIGS. 11-16 and 19, each of the longitudinal extension weldments 22, 24 has a central open ended slot 62 with two flanges 64 which are spaced and slanted to fit and extend into the two grooves 60, such that the grooves 60 serve as track indentations. During assembly by the user, the offset body 14 is slidingly received by one of the two extension weldments 22, 24.

Adjacent the two grooves 60, the offset body 14 includes two transverse through-holes 66. The longitudinal extension weldments 22, 24 include bolt slots 68 at an elevation and orientation which correspond with the two through-holes 66. The bolt slots 68 allow longitudinal flexibility between the offset body 14 and the selected longitudinal extension weldment 22 or 24. For instance, the preferred bolt slots 68 extend longitudinally for about 3¼ inches (83 mm), giving about 1.6 inches (40 mm) of longitudinal flexibility when attaching the offset body 14 to either of the extension weldments 22, 24. Longer bolt slots are particularly beneficial if OEMs in the future change their puck spacing slightly in the longitudinal direction. After the longitudinal placement of the offset body 14 is selected by sliding one of the two extension weldments 22, 24 to the appropriate longitudinal position, a pair of bolts 28 and nuts are used through the bolt slots 68 and through-holes 66 to fix the offset body 14 against sliding relative to the selected extension weldment 22 or 24. Alternative embodiments include different numbers of bolts/bolt holes other than two or including threads on the bolt holes 66 instead of using nuts.

In the preferred embodiment, the selected (long or short) extension weldment 22 or 24 extends rearwardly from the offset body 14, such that the central open ended slot 62 is at the front side of the extension weldment 22 or 24. The rear side of the extension weldment 22, 24 includes an attachment plate 70 with two bolt holes 72. In an alternative embodiment, the bolts 30 and the bolt holes 72 are replaced with threaded studs (not shown) that are welded to the attachment plate as part of the extension weldment.

In side view, the attachment plate 70 preferably sits at an angle θ relative to the longitudinal central axis 74 of the extension weldment 22, 24. In the preferred embodiment as called out in FIGS. 13 and 16, this angle θ is 45°.

Figure 17:
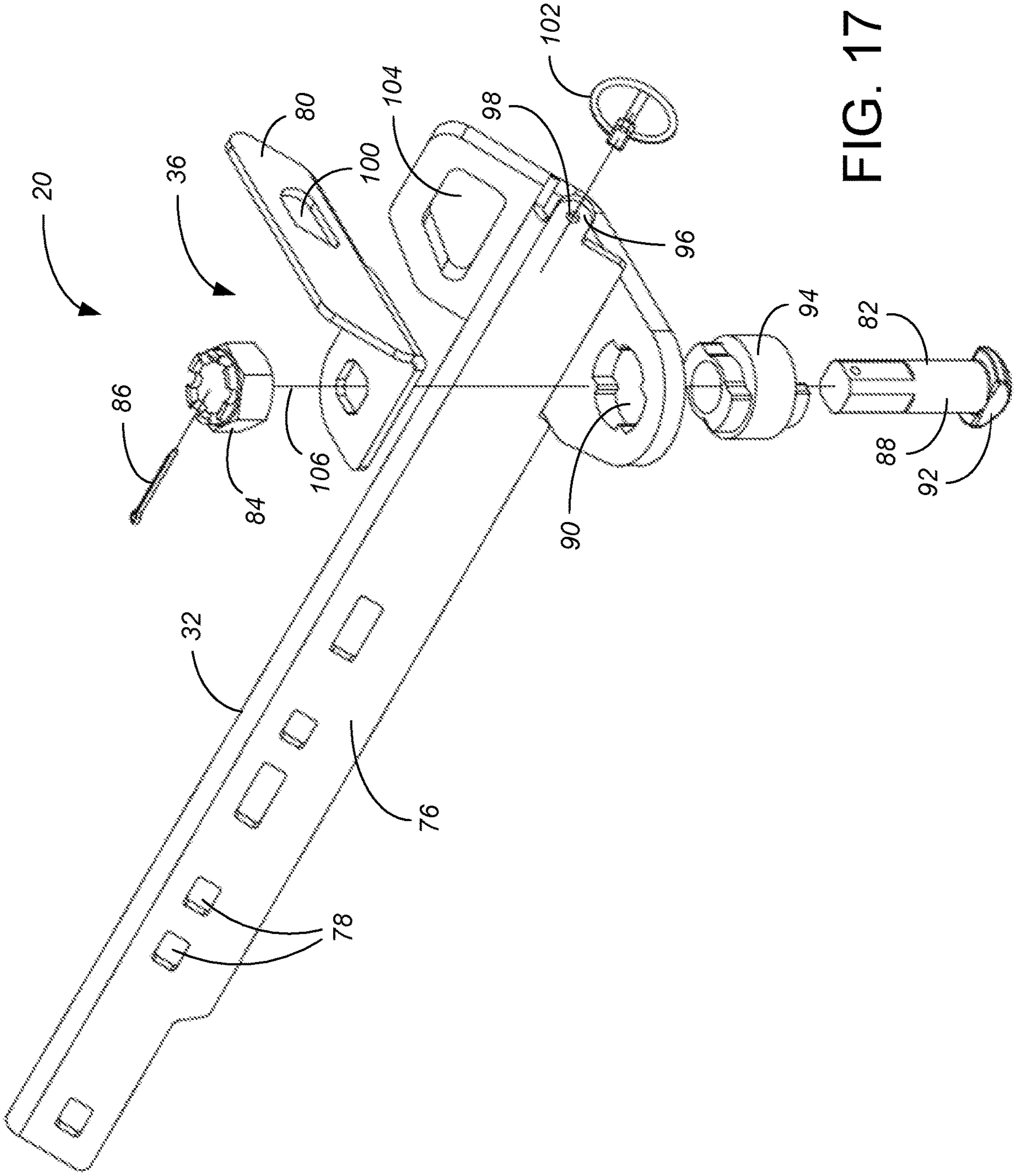
FIG. 17 is an exploded front perspective view of the driver side transverse anchor assembly from the preferred offset gooseneck ball hitch kit of FIGS. 4-6.
Figure 18:
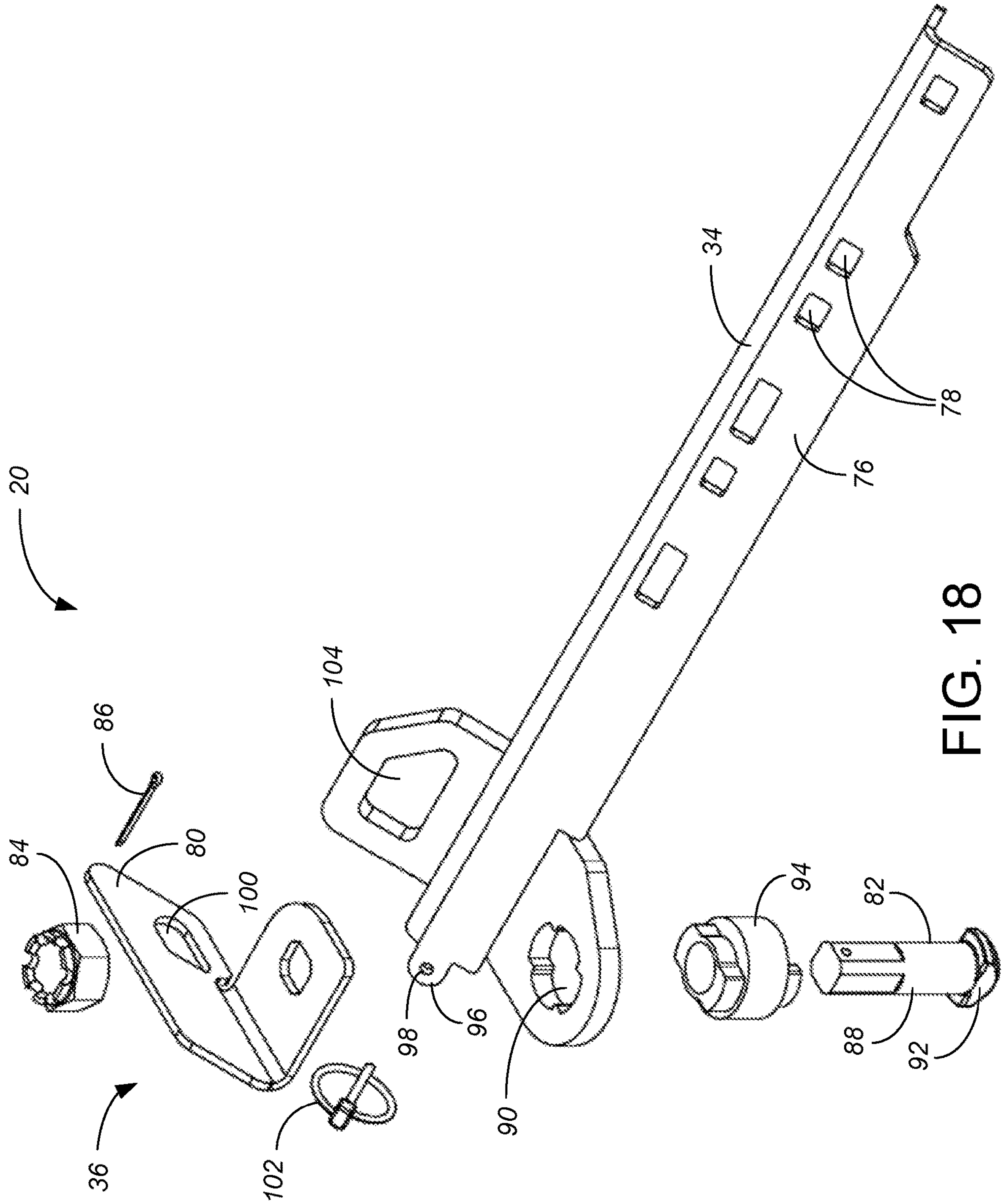
FIG. 18 is an exploded front perspective view of the passenger side transverse anchor assembly from the preferred offset gooseneck ball hitch kit of FIGS. 4-6.
Figure 19:
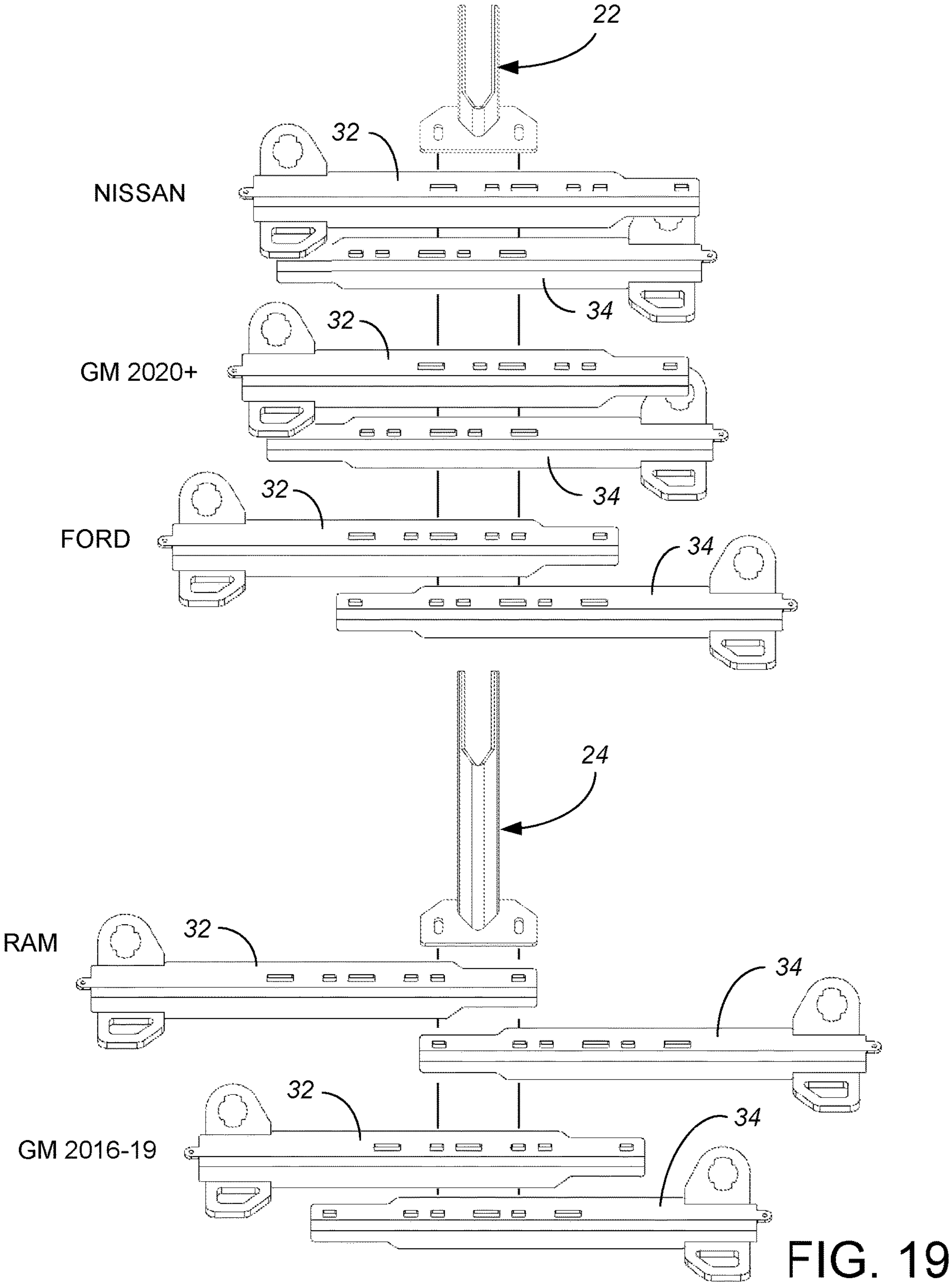
FIG. 19 is a top plan view of the transverse anchors and longitudinal connection weldments, laid out for attachment into the NISSAN, GM 2020+, FORD, RAM (FCA) and GM 2016-19 puck-type receiver openings.

The arm assemblies 20 are better shown in FIGS. 17-19. The front sides 76 of the L-bracket arms 32, 34 preferably extend at an angle which matches the angle θ of the attachment plate 70 of each extension weldment 22, 24. The front sides 76 of the L-bracket arms 32, 34 also include a series of bolt holes 78. As can better be seen in FIG. 19, the series of bolt holes 78 can match the spacing of the two bolt holes 72 through the attachment plate 70 of the extension weldments 22, 24 at a plurality of transverse widths, so the two L-bracket arms 32, 34 can be bolted via bolts 30 to the extension weldment 22 or 24 at any of a plurality of transverse spacings to match the transverse spacings of the various OEM puck sockets 38.

The preferred embodiments shown in the figures position a series of bolt holes 78 through the L-bracket arms 32, 34 and only two bolt holes 72 through the attachment plate 70, with the two L-bracket arms 32, 34 being simultaneously bolted both to each other and to the attachment plate 70 of the extension weldments 22, 24. An alternative embodiment uses a longer attachment plate (not shown) with one or more series of bolt holes through the longer attachment plate, and uses shorter L-bracket arms with only one or two bolts holes (or threaded studs) through each L-bracket arm. In such an alternative embodiment, the L-bracket arms never directly contact each other, but are only secured relative to each other through their respective connections to the longer attachment plate of the extension weldment. For instance, the longer attachment plate can include two vertically spaced series of ten bolt holes, with two vertically spaced bolt holes corresponding to each of the ten socket positions 38 shown in FIG. 1 on the tailgate side of the central gooseneck socket 40.

At the outside end of each arm assembly 20, an anchor structure 36 allows attachment into a puck socket 38. The preferred anchors 36, best shown in FIGS. 17 and 18, include an anchor handle 80 secured onto a T-bolt 82 such as using a castle nut 84 and cotter pin 86. The shaft 88 of the T-bolt 82 extends through an opening 90 in the L-bracket arm weldment 32, 34. With the head 92 of the T-bolt 82 dropped into the puck socket 38, the anchor handle 80 is accessible on the top of the arm assembly 20 and on the top of the pickup truck bed. The anchor handle 80 allows the T-bolt 82 to be pivoted 90°, moving the T-bolt head 92 from a disengaged orientation in the puck socket 38 to a secured orientation in the puck socket 38. A spacer 94 is used around each T-bolt shaft 88 so the elevation of the bottom of each L-bracket arm weldment 32, 34 matches the elevation of the top of the truck bed. The opening 90 in the L-bracket arm weldment 32, 34 is preferably + shaped, and the top of the spacer 94 can mate into the opening 90 in either of two orientations, to account for the fact that the sockets in RAM pucks are oriented differently than for the other OEMs.

In the preferred embodiment, each L-bracket arm weldment 32, 34 includes a tab 96 with a cotter pin hole 98, and the anchor handle 80 includes a tab opening 100 sized and positioned to correspond to the tab 96. Once the T-bolt head 92 is pivoted into the secured orientation, the tab 96 extends through the tab opening 100, and a cotter pin 102 is inserted by the user into the cotter pin hole 98 to prevent the anchor handle 80 from unintentionally pivoting out of the secured orientation.

An alternative embodiment fixes the T-bolt relative (fixed T-bolt not shown) to its L-bracket arm weldment 32, 34. During assembly of the alternative L-bracket arms to the pickup truck, each alternative L-bracket arm is first positioned so it extends longitudinally so the T-bolt head 92 can drop into the puck socket 38. Then the two fixed-bolt L-bracket arms are pivoted 90° to their transverse and/or overlapping position, pivoting the T-bolt head 92 within the puck socket 38 at the same time. However, the fixed T-bolt embodiment would require different arm weldments for RAM pucks as compared to other OEMs.

In the preferred embodiment, each L-bracket arm weldment 32, 34 also includes a safety chain loop 104. The safety chain loop 104 is preferably provided on a sloped portion of the plate used to define the opening 90 and the anchor axis 106.

In the preferred embodiment, the extension weldments 22, 24 and the L-bracket arm weldments 32, 34 are formed from Q235 plate steel. For instance, the central portion of the extension weldments 22, 24 can be stamped and bent from 6 mm plate material, the attachment plates 70 can be stamped from 10 mm plate material, and each of the L-bracket arm weldments 32, 34 can be stamped, bent and/or welded from 5 mm thick plate material.

Figure 20:
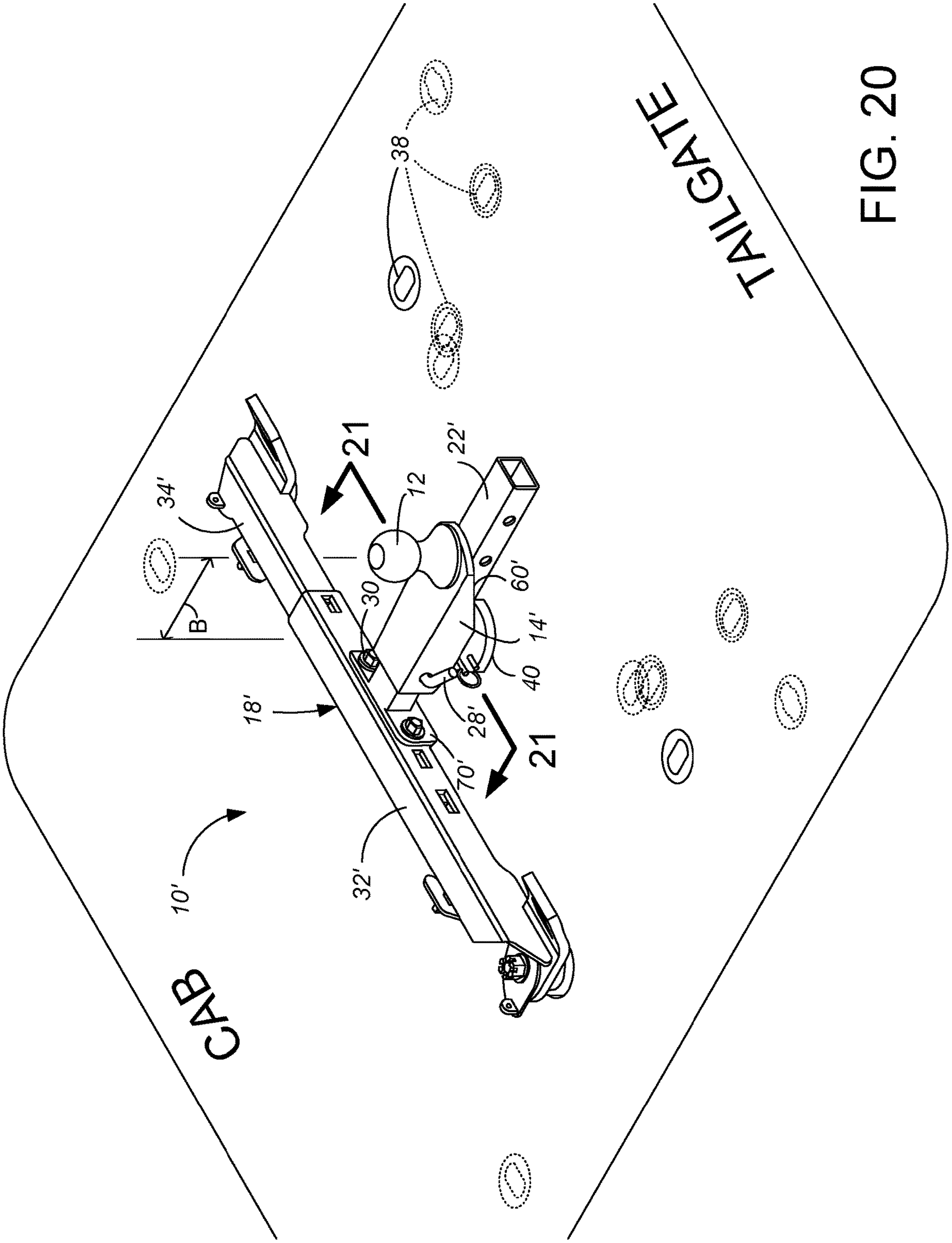
FIG. 20 is a rear perspective view, showing an alternative offset gooseneck ball hitch installed into a schematically shown FORD pickup truck bed, and showing some of the other OEM puck socket positions in dashed lines.

FIG. 20 shows an alternative embodiment 10' with a different offset body 14'. In this case, the frame connection structure 18' is formed of tubular members including two tubular transverse cross bars 32', 34' which mate in a telescoping relationship and an extension tube 22' as the longitudinal center support. The telescoping nature of the cross arm tubes 32', 34' enables them to be adjusted to any OEM width between puck locations. The offset body 14' has a cylindrical shank 16 which is secured down into the central socket 40 of the OEM puck system. The offset body 14' includes a longitudinal through hole 60' shaped and sized to receive the longitudinal extension tube 22' therethrough in a sliding relationship. The gooseneck ball 12 is provided on the offset body 14', such as offset by a distance B (preferably four inches) behind the axis 44 of the cylindrical shank 16. The extension tube 22' is secured to the cross arm tubes 32', 34' and runs through the offset body 14' to prevent the offset body 14' from rotating. If desired, a pinned connection 28' between the offset body 14' and the extension tube 22' can be used by the user to secure the offset body 14' at any of several longitudinally spaced positions relative to the cross arm tubes 32', 34', to account for the various longitudinal spacings that the OEM puck systems use between the central gooseneck socket 40 and the puck anchor locations 38.

Figure 1:
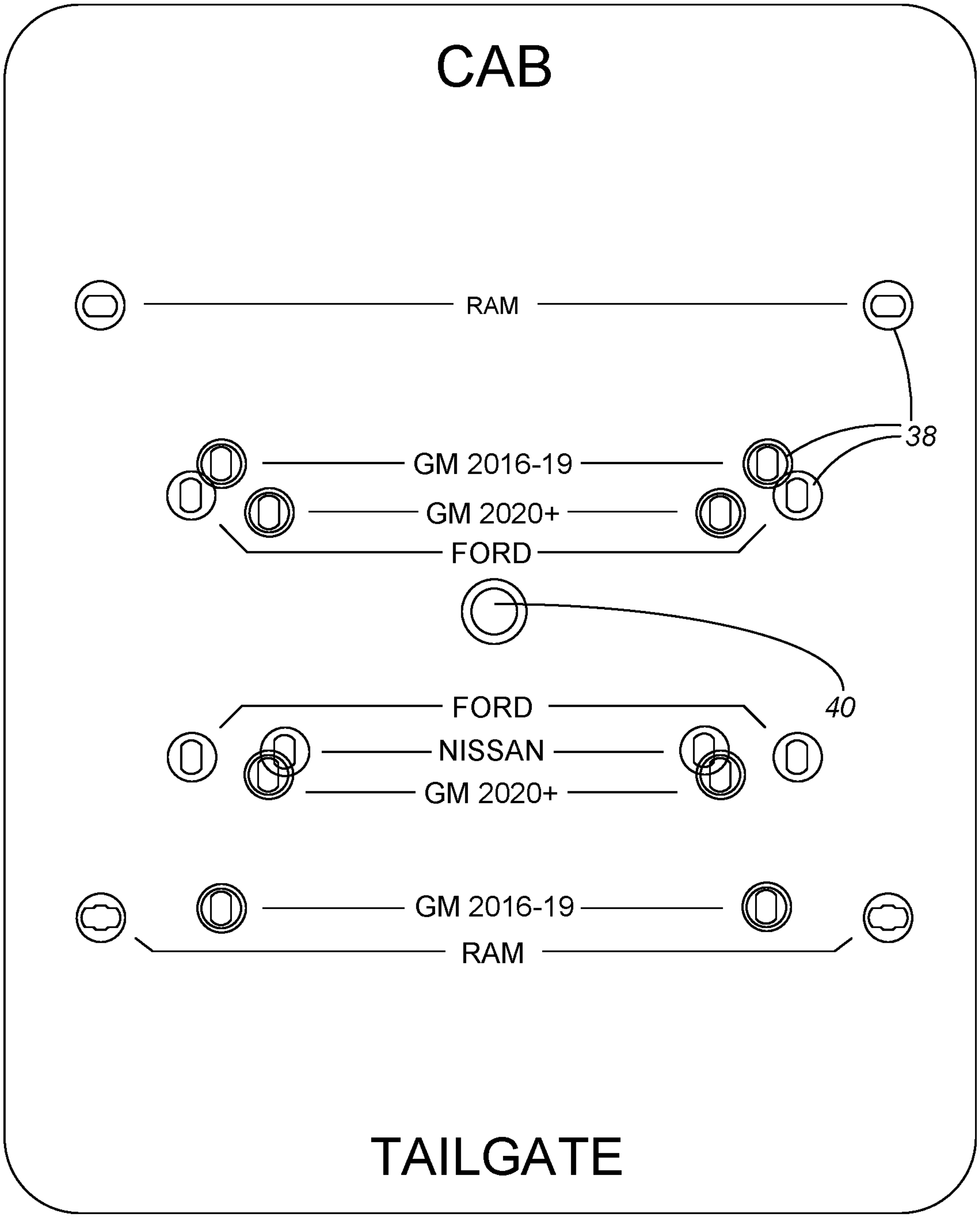
FIG. 1 is a schematic plan view, showing the locations of GM, FORD, RAM (FCA) and NISSAN puck-type receiver openings relative to the gooseneck hitch ball socket in the bed of a pickup truck.
Figure 2:
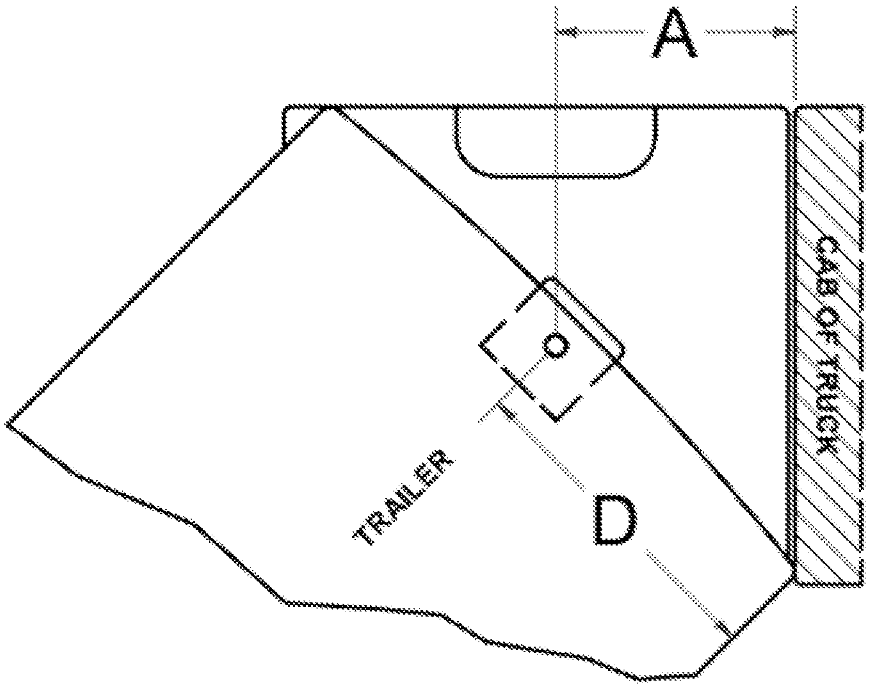
FIG. 2 is a schematic plan view, showing tight right turning of a trailer hitched to a pickup truck using an OEM gooseneck hitch ball socket, at the point of contact between the trailer and the cab of the pickup truck.
Figure 3:
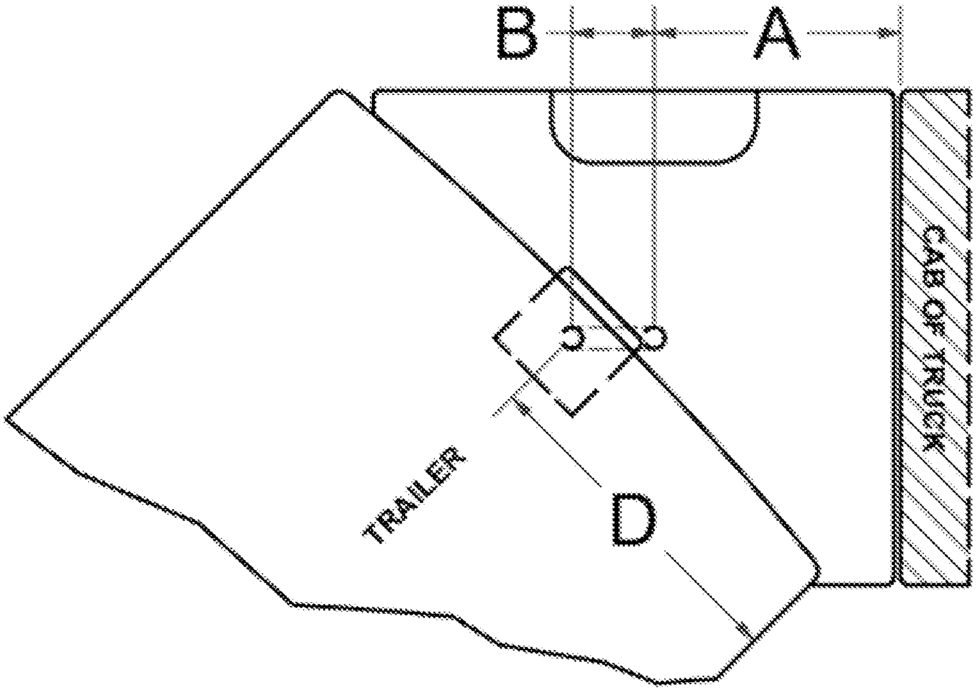
FIG. 3 is a schematic plan view, showing the same tight right turning of the trailer and pickup truck of FIG. 3, but using an offset gooseneck ball hitch.

In contrast to the two (short and long) longitudinal extensions 22, 24 of the embodiment 10 shown in FIG. 4, the offset gooseneck ball hitch 10' of FIG. 19 can match all five of the puck socket layouts of FIG. 1 using a single longitudinal extension tube 22'. However, the through hole 60' somewhat compromises the strength and robustness of the offset body 14' compared to the embodiment 14 of FIGS. 4-19.

FIG. 20 also demonstrates another element of flexibility of some of the preferred embodiments, that the cross arms 32', 34' can be positioned either toward the cab or toward the tailgate relative to the central socket 40 and still be used to prevent the offset body 14' from rotating.

Figure 21:
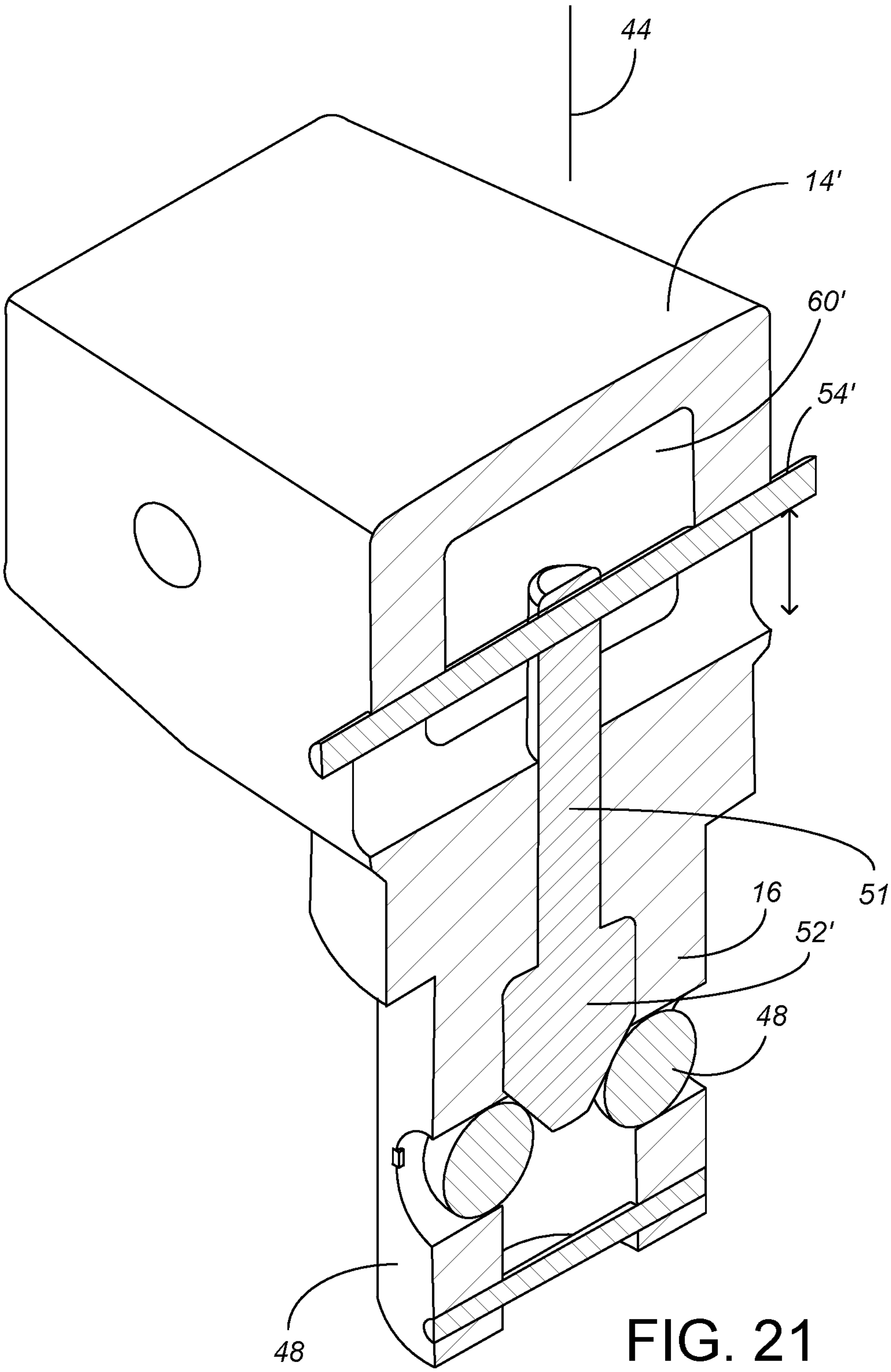
FIG. 21 is a cross-sectional perspective view through the shank/offset body of the embodiment of FIG. 20, taken along cut lines 21-21 in FIG. 20.

FIG. 21 shows a cross-sectional view through the shank 16 of the embodiment of FIG. 20, without showing the frame connection structure 18' or the gooseneck socket 40 of the pickup truck. Like the embodiment of FIGS. 4-19, a set of retention balls 48, projecting on sides of the cylindrical shank 16, are used to hold the offset body 14' down into the gooseneck socket 40. A retention shaft 51 runs vertically down the center of the shank 16, but this retention shaft 51 has a wedge shaped paddle 52' and moves vertically rather than pivoting about its axis 44. When the retention shaft 51 is at its lowered position, the wedge shaped paddle 52' bears against the two balls 48 pushing the two balls 48 outwardly so they extend beyond the cylinder defined by the shank 16 and into the half round groove of the OEM sockets 40. When the retention shaft 51 is at its raised position, it allows the two balls 48 to retreat to within the cylinder defined by the shank 16, thereby allowing the body 14' to be lowered into the socket 40 or raised out of the socket 40.

The retention shaft 51 is mounted on a lifting detent handle 54' which allows raising of the retention shaft 51 by the user. As best shown in FIG. 21, lifting the detent handle 54' releases the retention balls 48. However, when the extension tube 22' is in place within the offset body 14', it interferes with and prevents raising of the detent handle 54'. There is thus less chance of unintentional removal of the shank 16 from the gooseneck socket 40. However, because of this structure, the extension tube 22' cannot be preassembled with the offset body 14' prior to dropping the shank 16 of the offset body 14' into the OEM gooseneck socket 40.

Another alternative embodiment (not shown) functions similarly to the embodiment of FIGS. 20 and 21, but positions the detent handle 54' lower in the offset body 14', so the retention shaft 51 can be raised by the user without interfering with the extension tube 22'. In such a case, a secondary retention pin (not shown) can be used through the retention shaft 51 to ensure that the retention shaft 51 is not inadvertently raised.

With the tubular telescoping cross arms 32', 34', another alternative embodiment has only one of the T-bolt anchors rotatable relative to its cross arm, with the other T-bolt anchor being fixed relative to its cross arm. This attachment method involves lowering the fixed T-bolt down into its puck 38 and then rotating the entire cross arm 90° so the T-bolt holds the cross arm down into the puck 38. The other (rotatable) T-bolt 82 is then dropped down into its puck 38 and rotated 90° by the user turning its handle to hold the telescoping cross-arm assembly fully into the two pucks 38. The extension arm 22' is inserted through the offset body 14' and the combination 14'/22' is placed with the offset body 14' in the central socket 40 and bolted to the cross arm assembly 32'/34'. With one of the T-bolts being fixed relative to its cross arm 32' or 34', the cross arms assembly 32'/34' will not come loose from the pucks 38 even if the rotatable T-bolt 82 vibrates 90° to a release position. Such a frame connection structure thus cannot be removed from the socket 40 and pucks 38 without unbolting of the extension arm 22' from the cross arm assembly 32'/34'.

Another alternative embodiment includes a tubular portion (not shown) to replace the attachment plate 70, 70' as part of the longitudinal extension weldment 22, 24, 22'. The two cross-arms 32/34 or 32'/34' are assembled to extend through the tubular portion of the longitudinal extension weldment. Thus, when inserting or removing the gooseneck ball 12 from the truck bed, the user need not use any tools such as a wrench to bolt or unbolt the extension tube 22, 24, 22' from the cross arms 32/34 or 32'/34'. Instead, the user merely first pulls the lynch pins 102 and rotates the two T-bolts 82 90° to a release position, and then moves the retention handle 54, 54' so the retention balls 48 are retractable.

Figure 22:
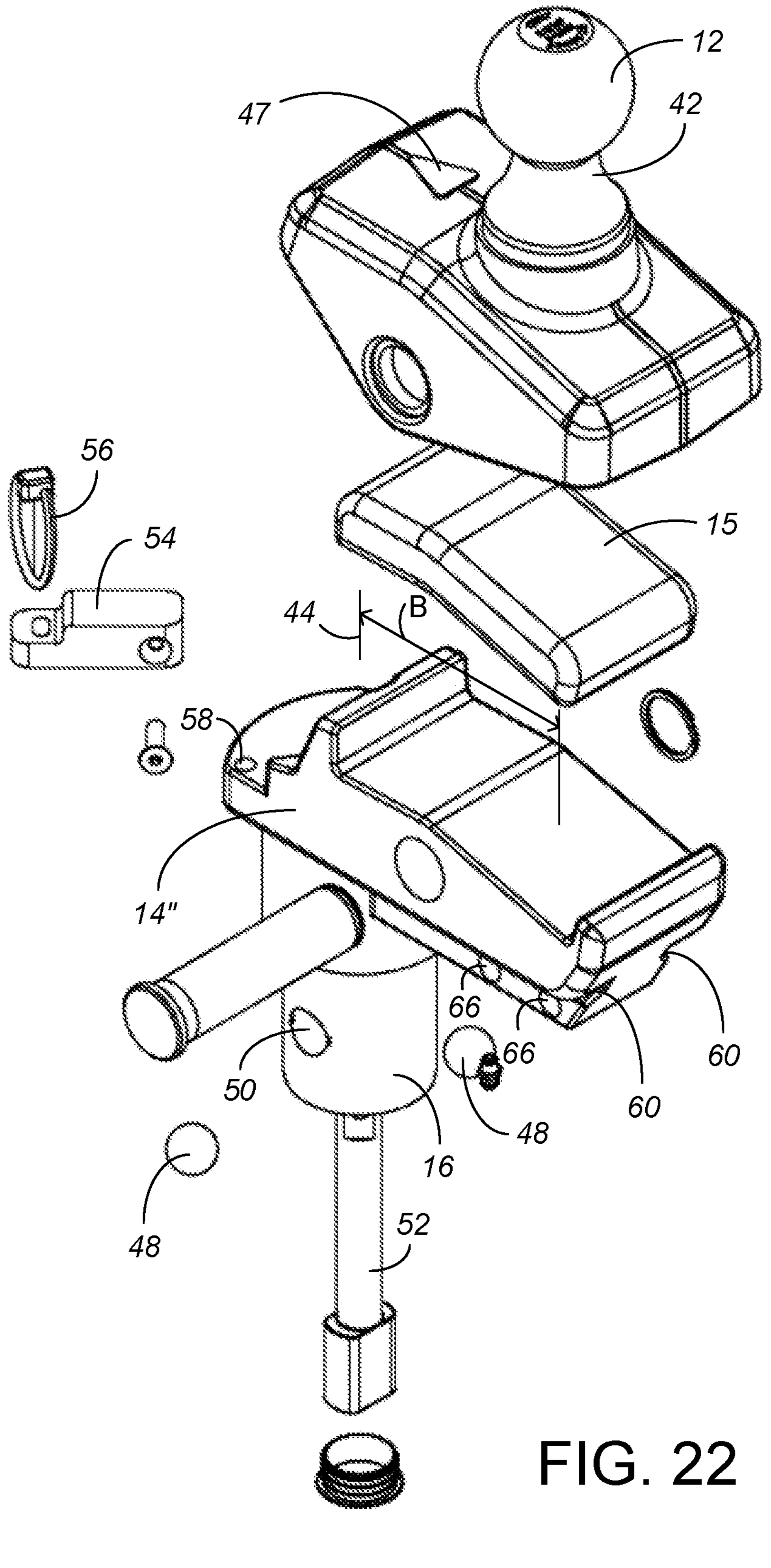
FIG. 22 is an exploded rear perspective view of an alternative offset gooseball assembly.

FIG. 22 represents an alternative embodiment of the offset body 14" which can use any of the securing methods and structures discussed above. Instead of having the gooseneck ball 12 be fixed relative to the offset body 14", this alternative embodiment incorporates the rocker ball concept of U.S. Pat. No. 11,192,408 (incorporated by reference) including an elastomeric pad 15, but with the resting position of the rocker ball 12 still at an offset position a distance B (four inches) behind the cylindrical shank axis 44.

While the preferred embodiments all attach into two puck socket locations 38 both either in front of or behind the gooseball socket 40, other arrangements are also possible. Some alternative embodiments can use a frame connection structure (not shown) which only is anchored into a single puck socket 38. When anchoring into a single puck socket 38, there is preferably structure that allows adjustment of the offset direction relative to the frame connection structure. Other alternative embodiments can use a frame connection structure (not shown) which anchors into one puck socket 38 in front of the gooseball socket 40 and into one puck socket 38 behind the gooseball socket 40. However, the preferred embodiments are generally laterally symmetrical, leading to more balanced support for the ball 12.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

What is claimed is:

1. An offset gooseneck ball hitch comprising:

a shank vertically receivable within a vertical gooseneck socket in a bed of a pickup truck, the shank defining a shank axis;

a ball above a neck secured relative to the shank, the ball and neck defining a ball axis offset from the shank axis; and a frame connection structure having an anchor adapted to mate into at least one puck socket in the bed of the pickup truck, the frame connection structure allowing the distance and/or orientation of the anchor relative to the shank to be adjusted so the offset gooseneck ball hitch can mate into at least two different puck spacings relative to the vertical gooseneck socket, wherein the frame connection structure comprises:

a driver side transverse anchor assembly;

a passenger side transverse anchor assembly, the passenger side transverse anchor assembly being adapted to mate and secure with the driver side transverse anchor assembly at any of a plurality of transverse spacings; and a longitudinal connection weldment securable at a middle position of the mating transverse anchor assemblies at any of the plurality of transverse spacings.

2. The offset gooseneck ball hitch of claim 1, wherein the driver side transverse anchor assembly comprises a driver side angle bar, and wherein the passenger side transverse anchor assembly comprises a passenger side angle bar having different dimensions than the driver side angle bar, such that the passenger side angle bar can mate above or below the driver side angle bar with both the driver side angle bar and the passenger side angle bar resting on the bed of the pickup truck.

3. The offset gooseneck ball hitch of claim 1, wherein the transverse anchor assemblies comprise telescoping tubes.

4. The offset gooseneck ball hitch of claim 1, wherein the ball is on an offset body, the offset body being slidably received on the longitudinal connection weldment.

5. The offset gooseneck ball hitch of claim 4, wherein the offset body comprises at least one threaded bolt hole, and further comprising a bolt for securing the shank at a selected position relative to the longitudinal connection weldment.

6. The offset gooseneck ball hitch of claim 4, wherein the offset body includes two track indentations on opposing sides of a trailing end of the offset body, with the longitudinal connection weldment having a slot between two flanges spaced to correspond with the track indentations, such that the offset body can slide relative to the longitudinal connection weldment while each flange is in one of the two track indentations.

7. The offset gooseneck ball hitch of claim 4, wherein the offset body comprises a longitudinally directed through-hole sized to receive a portion of the longitudinal connection weldment in a slidable connection.

8. The offset gooseneck ball hitch of claim 1, wherein the longitudinal connection weldment is secured to the transverse anchor assemblies with a bolt connection which secures the transverse anchor assemblies at a selected transverse spacing.

9. The offset gooseneck ball hitch of claim 8, wherein the bolt connection occurs through a plate oriented at a non-perpendicular angle relative to a longitudinal axis of the longitudinal connection weldment.

10. The offset gooseneck ball hitch of claim 1, wherein the anchor comprises a downwardly directed T-bolt and an anchor handle for turning the T-bolt within the puck socket.

11. The offset gooseneck ball hitch of claim 1, wherein the shank comprises at least one extension structure movable between an insertion position where the extension structure is within a profile of the shank for insertion into the vertical gooseneck socket or removal from the vertical gooseneck socket and a securing position wherein the extension structure is outside the profile of the shank to retain the shank within the vertical gooseneck socket.

12. The offset gooseneck ball hitch of claim 11, wherein the extension structure comprises a ball moved laterally by a paddle, the paddle having a handle accessible outside the vertical gooseneck socket.

13. A method of securing an offset gooseneck ball hitch in a bed of a pickup truck, the method comprising:

positioning a shank within a vertical gooseneck socket in the bed of the pickup truck, the shank defining a shank axis, the shank supporting a ball above a neck secured relative to the shank, the ball and neck defining a ball axis offset from the shank axis; and securing the ball against rotation about the shank axis by a frame connection structure, the frame connection having an anchor adapted to mate into at least one puck socket in the bed of the pickup truck, wherein the frame connection structure allows the distance and/or orientation of the anchor relative to the shank to be adjusted so the offset gooseneck ball hitch can mate into at least two different puck spacings relative to the vertical gooseneck socket, wherein the ball and shank both extend from an offset body, and wherein the frame connection structure has a sliding connection with the offset body which can be secured at any of a plurality of selected positions, the method further comprising:

sliding the offset body relative to the frame connection structure, and securing the offset body at a selected position which corresponds to spacing between the puck socket and the vertical gooseneck socket.

14. The method of claim 13, wherein the frame connection structure comprises:

a driver side transverse anchor assembly; and a passenger side transverse anchor assembly, the passenger side transverse anchor assembly being adapted to mate and secure with the driver side transverse anchor assembly at any of a plurality of transverse spacings; and wherein the at least one puck socket comprises a first puck socket and a second puck socket;

the method further comprising:

anchoring the driver side transverse anchor assembly into the first puck socket;

anchoring the passenger side transverse anchor assembly into the second puck socket at a selected transverse spacing between the driver side transverse anchor assembly and the passenger side transverse anchor assembly; and securing the passenger side transverse anchor assembly relative to the driver side transverse anchor assembly at the selected transverse spacing.

15. The method of claim 14, wherein the driver side transverse anchor assembly mates above or below the passenger side transverse anchor assembly;

wherein the anchoring acts comprise placing the driver side transverse anchor assembly on top of or underneath the passenger side transverse anchor assembly; and wherein the securing of the passenger side transverse anchor assembly to the driver side transverse anchor assembly also simultaneously secures a longitudinal connection weldment at a middle position of the mating transverse anchor assemblies.

16. The method of claim 14, wherein the driver side transverse anchor assembly mates in a telescoping relationship with the passenger side transverse anchor assembly; and wherein the securing of the passenger side transverse anchor assembly to the driver side transverse anchor assembly also simultaneously secures a longitudinal connection weldment at a middle position of the mating transverse anchor assemblies.

17. The method of claim 13, wherein the anchor comprises a downwardly directed T-bolt and an anchor handle for turning the T-bolt within the puck socket, and wherein the method comprises using the anchor handle to turn the T-bolt within the puck socket.

18. An offset gooseneck ball hitch comprising:

a shank vertically receivable within a vertical gooseneck socket in a bed of a pickup truck, the shank defining a shank axis, wherein the shank comprises at least one extension structure movable between an insertion position where the extension structure is within a profile of the shank for insertion into the vertical gooseneck socket or removal from the vertical gooseneck socket and a securing position wherein the extension structure is outside the profile of the shank to retain the shank within the vertical gooseneck socket;

an offset body supporting a ball above a neck relative to the shank, the ball and neck defining a ball axis offset from the shank axis;

a frame connection structure comprising:

a driver side transverse anchor assembly having a driver side anchor adapted to mate into a first puck socket in the bed of the pickup truck;

a passenger side transverse anchor assembly having a passenger side anchor adapted to mate into a second puck socket in the bed of the pickup truck; and a longitudinal connection weldment securable to the driver side transverse anchor assembly, to the passenger side transverse anchor assembly, and to the offset body;

the frame connection structure allowing the offset gooseneck ball hitch to mate into at least two different puck spacings relative to the vertical gooseneck socket.

19. An offset gooseneck ball hitch comprising:

a shank vertically receivable within a vertical gooseneck socket in a bed of a pickup truck, the shank defining a shank axis, wherein the shank comprises at least one extension structure movable between an insertion position where the extension structure is within a profile of the shank for insertion into the vertical gooseneck socket or removal from the vertical gooseneck socket and a securing position wherein the extension structure is outside the profile of the shank to retain the shank within the vertical gooseneck socket;

a ball above a neck secured relative to the shank, the ball and neck defining a ball axis offset from the shank axis; and a frame connection structure having an anchor adapted to mate into at least one puck socket in the bed of the pickup truck, the frame connection structure allowing the distance and/or orientation of the anchor relative to the shank to be adjusted so the offset gooseneck ball hitch can mate into at least two different puck spacings relative to the vertical gooseneck socket.

* * * * *